US009508258B2

United States Patent
Arai et al.

(10) Patent No.: US 9,508,258 B2
(45) Date of Patent: Nov. 29, 2016

(54) INTERSECTION GUIDE SYSTEM, METHOD, AND PROGRAM

(71) Applicant: AISIN AW CO., LTD., Anjo-shi, Aichi-ken (JP)

(72) Inventors: Yumie Arai, Tokyo (JP); Ken Ishikawa, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/424,681

(22) PCT Filed: Mar. 18, 2013

(86) PCT No.: PCT/JP2013/057643
§ 371 (c)(1),
(2) Date: Feb. 27, 2015

(87) PCT Pub. No.: WO2014/050172
PCT Pub. Date: Apr. 3, 2014

(65) Prior Publication Data
US 2015/0221220 A1 Aug. 6, 2015

(30) Foreign Application Priority Data
Sep. 28, 2012 (JP) ................. 2012-217016

(51) Int. Cl.
G08G 1/095 (2006.01)
G08G 1/09 (2006.01)
(Continued)

(52) U.S. Cl.
CPC G08G 1/09 (2013.01); B60Q 1/00 (2013.01); G01C 21/3602 (2013.01);
(Continued)

(58) Field of Classification Search
CPC ............ G01C 21/3632; G01C 21/3647; G01C 21/3658; G01C 21/00; G01C 21/30;
(Continued)

(56) References Cited

U.S. PATENT DOCUMENTS 6,360,168 B1 * 3/2002 Shimabara ......... G01C 21/3638
340/990
8,036,823 B2 * 10/2011 Akita ................. G01C 21/3632
701/429
(Continued)

FOREIGN PATENT DOCUMENTS

JP H07063572 A 3/1995
JP H08184452 A 7/1996
(Continued)

OTHER PUBLICATIONS

Jun. 18, 2013 International Search Report issued in International Application No. PCT/JP2013/057643.

*Primary Examiner* — Hoi Lau
(74) *Attorney, Agent, or Firm* — Oliff PLC

(57) ABSTRACT

Intersection guide systems, methods, and programs acquire a degree of approach of a vehicle to an intersection ahead of a vehicle and display a guide image at a position of the intersection superimposed on a forward scene ahead of the vehicle. The systems, methods, and programs set, as a position of superimposition of the guide image, an intersection position within the forward scene when the degree of approach is less than a threshold. The intersection position corresponds to a registered position registered in map information as the position of the intersection. The systems, methods, and programs set, as the position of superimposition, a straight-line position within the forward scene when the degree of approach is equal to or more than the threshold. The straight-line position corresponds to a position on a
(Continued)

straight-ahead line that is a straight line extending in a travel direction of the vehicle from the vehicle.

20 Claims, 4 Drawing Sheets

(51) Int. Cl.
    *G06F 17/30*     (2006.01)
    *G09G 5/36*     (2006.01)
    *G01C 21/36*     (2006.01)
    *B60Q 1/00*     (2006.01)

(52) U.S. Cl.
    CPC ......... *G01C 21/365* (2013.01); *G01C 21/3655* (2013.01); *G06F 17/30* (2013.01); *G09G 5/36* (2013.01)

(58) Field of Classification Search
    CPC ............... G01C 21/36; G01C 21/32; G01C 21/34; G06G 17/30; G08G 1/09
    USPC .............. 340/932.2, 907; 701/532, 533, 431, 701/436, 437, 429, 465
    See application file for complete search history.

(56) References Cited

U.S. PATENT DOCUMENTS

| | | | | |
|---|---|---|---|---|
| 8,103,442 B2* | 1/2012 | Akita | ................ | G01C 21/3647 701/457 |
| 8,239,131 B2* | 8/2012 | Kindo | .................. | G01C 21/30 701/436 |
| 9,347,786 B2* | 5/2016 | Ishikawa | ............ | G01C 21/3632 |
| 2006/0195257 A1* | 8/2006 | Nakamura | ......... | G01C 21/3632 701/437 |
| 2008/0208450 A1* | 8/2008 | Katzer | ............... | G01C 21/3635 701/533 |
| 2009/0132161 A1* | 5/2009 | Akita | ................ | G01C 21/3647 701/532 |
| 2009/0187335 A1* | 7/2009 | Muhlfelder | ........ | G01C 21/3635 701/532 |
| 2009/0240426 A1* | 9/2009 | Akita | ................ | G01C 21/3647 701/533 |
| 2009/0240431 A1* | 9/2009 | Chau | .................. | G01C 21/3647 701/532 |
| 2010/0131190 A1* | 5/2010 | Terauchi | ............ | G01C 21/3629 701/533 |
| 2010/0153000 A1* | 6/2010 | Akita | ................ | G01C 21/3632 701/429 |
| 2010/0161208 A1* | 6/2010 | Akita | ................ | G01C 21/3647 701/533 |
| 2010/0217513 A1* | 8/2010 | Takeda | ............... | G01C 21/3611 701/532 |
| 2010/0250116 A1* | 9/2010 | Yamaguchi | ........ | G01C 21/3644 701/533 |
| 2010/0253542 A1* | 10/2010 | Seder | ........................ | G01S 7/22 340/932.2 |
| 2010/0256900 A1* | 10/2010 | Yamaguchi | ............ | G01C 21/36 701/533 |
| 2011/0040480 A1* | 2/2011 | Tebbutt | .................. | G01C 21/00 701/431 |
| 2011/0103651 A1* | 5/2011 | Nowak | ............... | G01C 21/3647 382/106 |
| 2011/0109618 A1* | 5/2011 | Nowak | ............... | G01C 21/3647 345/419 |
| 2011/0153200 A1* | 6/2011 | Tsuji | .................... | G01C 21/3658 701/533 |
| 2011/0215950 A1* | 9/2011 | Wagner | ............... | G01C 21/3632 340/995.14 |
| 2011/0288766 A1* | 11/2011 | Nagasawa | .......... | G01C 21/3632 701/533 |
| 2014/0092134 A1* | 4/2014 | Nagasawa | .......... | B60K 35/00 345/633 |
| 2014/0218509 A1* | 8/2014 | Kondo | ............... | G01C 21/3647 348/118 |
| 2014/0236473 A1* | 8/2014 | Kondo | ............... | G01C 21/3647 701/400 |
| 2014/0297181 A1* | 10/2014 | Kondo | ............... | G08G 1/09626 701/532 |
| 2015/0198456 A1* | 7/2015 | Ishikawa | ............ | G01C 21/3632 701/437 |
| 2015/0221220 A1* | 8/2015 | Arai | ........................ | G06F 17/30 340/907 |
| 2015/0260540 A1* | 9/2015 | Ishikawa | ............ | G01C 21/3632 701/436 |

FOREIGN PATENT DOCUMENTS

| | | |
|---|---|---|
| JP | 2001082969 A | 3/2001 |
| JP | 2002-318277 A | 10/2002 |
| JP | 2005265573 A | 9/2005 |
| JP | 2008122150 A | 5/2008 |
| JP | 2010181363 A | 8/2010 |
| JP | 2011149835 A | 8/2011 |
| WO | 2007/129382 A1 | 11/2007 |
| WO | 2007/142084 A1 | 12/2007 |

\* cited by examiner

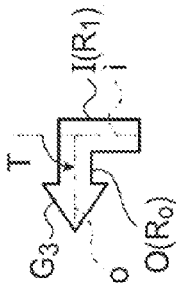
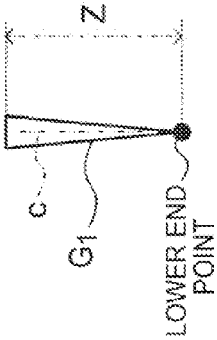
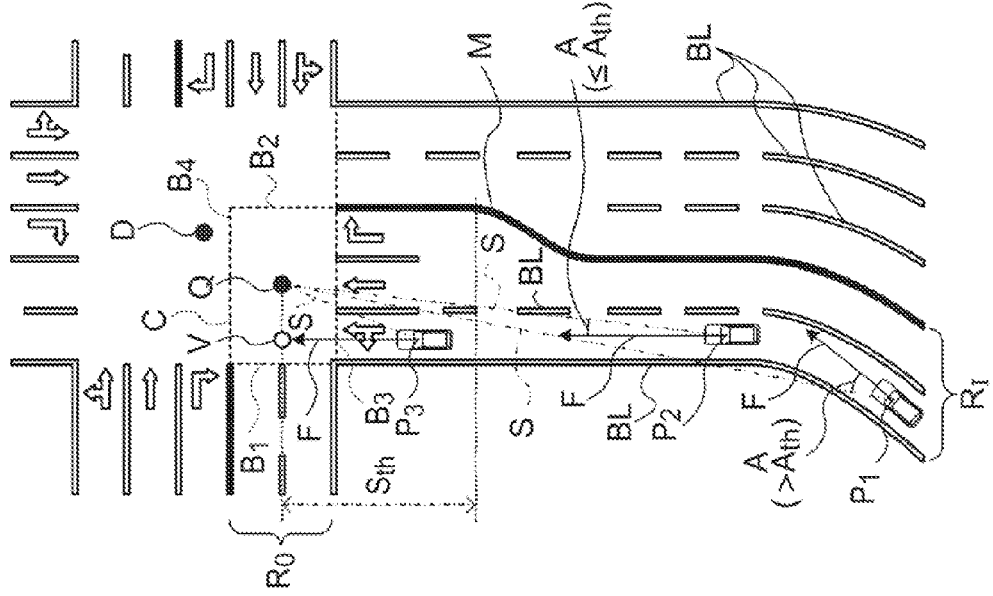
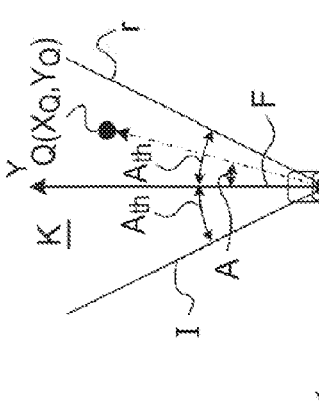
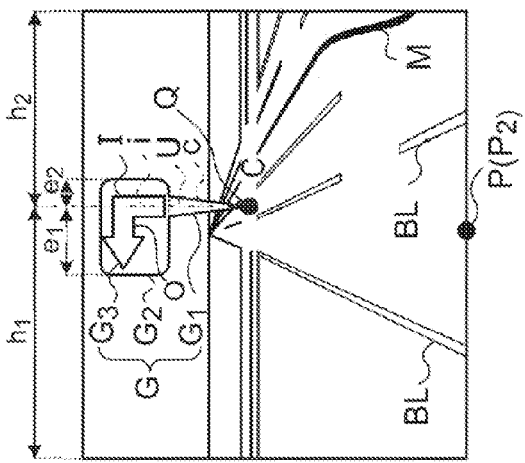

FIG. 3A
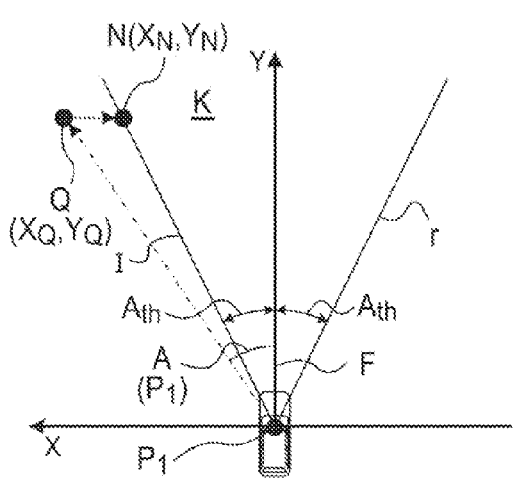
FIG. 3B
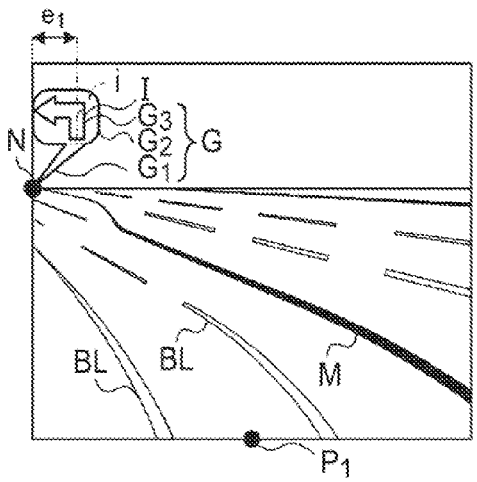
FIG. 3C
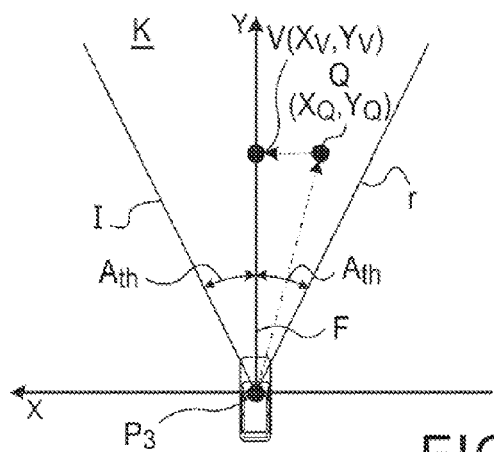
FIG. 3D
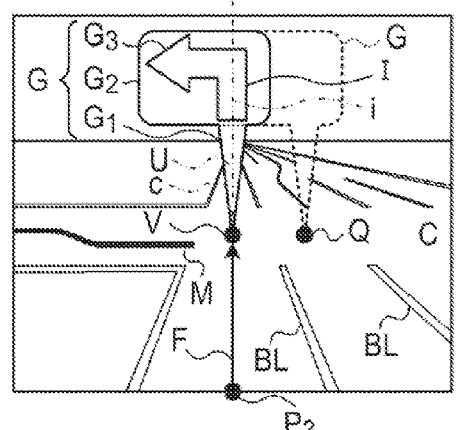
FIG. 3E

INTERSECTION GUIDE SYSTEM, METHOD, AND PROGRAM

TECHNICAL FIELD

Related technical fields include intersection guide systems, methods, and programs that provide guidance on the position of an intersection.

BACKGROUND

Hitherto, there has been known a technology in which a forward scenery image is captured using a video camera installed on a vehicle to show the scenery image on a screen of a display device (see Japanese Patent Application Publication No. 7-63572 (JP 7-63572 A)). In JP 7-63572 A, the location of a guide target intersection on the scenery image is specified on the basis of an intersection node stored in map data, and an arrow figure is synthesized at the specified location. This makes it possible to visually recognize the position of the guide target intersection on the basis of the position at which the arrow figure is shown on the scenery image.

SUMMARY

When the vehicle approaches the guide target intersection to some degree, however, a driver drives the vehicle toward a specific position within the guide target intersection after clearly visually recognizing the guide target intersection in the real scene or the scenery image. For example, in the case where it is desired to make a right turn at the guide target intersection, the vehicle is driven toward the position at which a right-turn lane is connected to the guide target intersection. In such a situation, if an arrow figure is synthesized at the location of the guide target intersection on the scenery image, which is specified on the basis of the intersection node stored in the map data, as described in JP 7-63572 A, a sense of discomfort may be had. That is, if there is a difference between the position of the intersection node stored in the map data and the position within the guide target intersection toward which the driver is heading after clearly visually recognizing the guide target intersection, the driver may have a sense of discomfort as if he/she is guided to a position that is not intended by the driver as the position of the guide target intersection.

Exemplary embodiments of the broad inventive principles described herein provide a technology for providing guidance on the position of an intersection without giving a sense of discomfort even in the case where a vehicle approaches the intersection.

According to exemplary embodiments, degree-of-approach acquisition means acquires a degree of approach of a vehicle to an intersection that is present ahead of the vehicle. Display control means causes a display section to display a guide image that provides guidance on a position of the intersection as superimposed on a forward scene ahead of the vehicle. The display control means sets, as a position of superimposition of the guide image, a position within the forward scene which corresponds to a registered position registered in map information, as the position of the intersection in the case where the degree of approach is less than a threshold. On the other hand, the display control means sets, as the position of superimposition of the guide image, a position within the forward scene, which corresponds to a position on a straight-ahead line that is a straight line extending in a travel direction of the vehicle from the vehicle, in the case where the degree of approach is equal to or more than the threshold.

Here, as the degree of approach to an intersection becomes larger, a driver can more clearly visually recognize an image of the intersection in the forward scene. Thus, it can be estimated that in the case where the degree of approach to the intersection is equal to or more than the threshold, the driver decides the target position as the target to be reached when entering the intersection on the basis of the clearly visually recognized image of the intersection, and drives the vehicle toward the target position. That is, it can be estimated that in the case where the degree of approach to the intersection is equal to or more than the threshold, the driver has already determined the course of the vehicle such that the target position is present in the travel direction of the vehicle. In this way, when the target position is present in the travel direction of the vehicle, the display control means acquires a position within the forward scene, which corresponds to a position on the straight-ahead line extending in the travel direction of the vehicle from the vehicle, and sets the acquired position as the position of superimposition of the guide image. In this way, by superimposing the guide image on a position on the straight-ahead line, it is possible to provide guidance on traveling toward the target position that is present in the travel direction of the vehicle. Thus, it is possible to prevent giving a sense of discomfort even in the case where the vehicle approaches an intersection and the driver has already decided the target position within the intersection.

Meanwhile, the display control means acquires a position within the forward scene, which corresponds to the registered position registered in the map information as the position of the intersection in the case where the degree of approach is less than the threshold, and sets the acquired position as the position of superimposition of the guide image. This allows the driver to recognize the position of the intersection in the forward scene. That is, in the case where the degree of approach is less than the threshold, the driver can recognize the position of the intersection in reliance on the position of the guide image in the forward scene although the viewability of an image of the intersection in the forward scene is low.

Here, the degree of approach is an index that becomes larger as the vehicle approaches an intersection, and that becomes larger as an image of the intersection becomes more clearly recognizable. For example, the degree-of-approach acquisition means may acquire the degree of approach on the basis of the positional relationship between the vehicle and the intersection, or may acquire the degree of approach on the basis of the travel state of the vehicle such as the vehicle speed or the travel direction. An intersection that is present ahead of the vehicle may be an intersection to be reached in the case where the vehicle travels forward on the road, and may be an intersection to be reached in the case where the vehicle travels forward on the expected travel path. A guide image may be an image that provides guidance on the position of an intersection, and may be an image indicating that an image of the intersection is present at the position of superimposition at which the guide image is superimposed. For example, the guide image may be a point-like image that is present at the set position of superimposition, may be a linear image, a distal end or a bent point of which is present at the set position of superimposition, or may be a polygonal image, a vertex of which is present at the set position of superimposition. Further, the guide image may include not only a portion indicating the position of an intersection but also a portion that provides guidance on information on the intersection other than the position of the intersection.

The display control means may project the forward scene on the display section by causing the display section to display an image representing the forward scene (hereinafter referred to as a "forward image"). That is, the display control means may superimpose the guide image on the forward image, and cause the display section to display the forward image on which the guide image is superimposed. The forward image may be obtained by capturing a forward scene using a camera, or may be obtained by drawing a forward scene on the basis of the map information. Further, the display section may be constituted as a semi-transmissive head-up display that displays the guide image as superimposed on the actual scene that the driver visually recognizes over the windshield of the vehicle. In this case, the display section transmits a part of the forward scene visually recognized by the driver so that the transmitted part of the scene is projected onto the display section as the forward scene.

The threshold may be set to a degree of approach at which an image of an intersection can be clearly visually recognized in the forward image to such a degree that allows the driver to decide the target position within the intersection. That is, the threshold may be set to a degree of approach at which an image of an intersection in the forward scene has a predetermined size. For example, the threshold may be set to a degree of approach at which an image of an intersection in the forward scene has such a size that allows an image of a connected road connected to the intersection to be clearly visually recognized. This is because if the image of the connected road can be clearly visually recognized, a position within the intersection through which the vehicle can smoothly exit the intersection and enter the connected road can be decided as the target position. Further, the threshold may be set to a degree of approach at which an image of an intersection in the forward scene has such a size that allows the lane configuration (the direction of connected roads that can be entered after exiting each lane) of roads for entry into the intersection to be clearly visually recognized. This is because if the lane configuration can be clearly visually recognized, it is possible to specify the lane to travel in when entering the intersection, and to decide a position on the specified lane as the target position. The size of an image of an intersection may be the area of the image of the intersection in the forward scene, may be the length of the image of the intersection in the vertical direction of the forward scene, or may be the length of the image of the intersection in the lateral direction of the forward scene.

The registered position is a position registered in the map information as the typical position on the road surface within an intersection, and may be the geometric center position of the road surface within the intersection. It should be noted, however, that the registered position may not necessarily be a position registered in the map information as the position of an intersection, and may be a position that can be derived on the basis of only data registered in the map information. The position within the forward scene, which corresponds to the registered position, means a position within the forward scene at which an image of an object that is present at the registered position is projected on the display section. The position of superimposition of the guide image may be a position of superimposition of at least a part of the guide image, and may be a position of superimposition of a portion of the guide image, which indicates the position of an intersection.

The travel direction of a vehicle means forward in the longitudinal direction (direction orthogonal to the axles) of the vehicle. The straight-ahead line is a straight line extending in the travel direction of a vehicle from the vehicle, and means the track of the vehicle for a case where the vehicle is assumed to move straight with the steering angle kept at 0°. A position within the forward scene, which corresponds to a position on the straight-ahead line, means a position within the forward scene at which an image of an object that is present at a position on the straight-ahead line is projected on the display section.

The display control means may acquire a projected space that is a part of a space ahead of the vehicle and corresponds to the forward scene projected on the display section, and set, as the position of superimposition of the guide image, a position within the forward scene, which corresponds to a position at a left end or a right end within the projected space, in the case where the degree of approach is less than the threshold and the registered position is present on a left side or a right side with respect to the projected space. That is, the position of an end of the forward scene on the side on which the registered position is present may be set as the position of superimposition of the guide image in the case where the registered position is located outside the projected space and thus the position corresponding to the registered position is not present within the forward scene. Consequently, it is possible to recognize whether the intersection is located on the left side or the right side with respect to the projected space corresponding to the forward scene projected on the display section. Since the position of superimposition of the guide image is set to the position at an end of the forward scene on the side on which the registered position is present, guidance on a position that is as close to the guide intersection as possible can be provided. In the case where the display section is caused to display the forward image in which the forward scene is captured, the projected space means a space within the field of view of a camera that captures the forward image. In the case where the display section is caused to display an extracted part of the forward image, as a matter of course, the projected space means a part of the space within the field of view of the camera, which corresponds to the extracted forward image. In the case where the display section is caused to display the forward image in which the forward scene is drawn on the basis of the map information, the projected space means a space within the field of view set when drawing the forward image. In the case where the actual forward scene is projected on a semi-transmissive display section, the projected space means a space that can be visually recognized by the driver through the display section.

The display control means may determine that the degree of approach is less than the threshold in the case where a remaining distance from the vehicle to the intersection is longer than a predetermined reference distance. The degree of approach becomes larger as the remaining distance from the vehicle to the intersection becomes shorter. Therefore, it can be determined that the degree of approach is less than the threshold in the case where the remaining distance is longer than the reference distance. The reference distance may be set to a remaining distance at which it can be determined that the vehicle is traveling toward a target position for entry into an intersection, which is decided in advance by the driver. For example, the reference distance may be a remaining distance at which an image of an intersection in the forward scene has such a size that allows the image of the intersection to be clearly visually recognized to such a degree that allows the target position to be decided. The display control means may set a reference distance for each intersection, and may specify the size of an intersection on the basis of the map information, and set the reference distance to be longer as the size of the intersection is larger. Further, the reference distance may be a remaining distance at which it can be considered that the vehicle has entered an extended section provided before an intersection and provided with an extended lane such as a right-turn lane. This is because the vehicle may not be able to travel in the extended lane in a section before the lane extended section even if the driver has decided a position in the extended lane as the target position, and the target position decided in the extended lane may not be present on the straight-ahead line. Still further, the reference distance may be a remaining distance at which it can be considered that the vehicle has entered a section which is provided before an intersection and in which a lane change is prohibited. Consequently, it is possible to provide the driver with guidance on maintaining the current travel direction without making a lane change in the section in which a lane change is prohibited.

The display control means may determine that the degree of approach is less than the threshold in the case where an angle formed in a horizontal plane between a straight line extending from the vehicle to the registered position and the straight-ahead line is larger than a predetermined reference angle. As the vehicle approaches an intersection, there is a lower possibility that the road is curved between the vehicle and the intersection, and there is a higher possibility that the intersection is present right ahead of the vehicle. Thus, it can be considered that the degree of approach is larger as the angle formed in a horizontal plane between the straight line extending from the vehicle to the registered position and the straight-ahead line becomes smaller. For example, the reference angle may be set to such an angle that it can be considered that the intersection is present on the straight-ahead line. A case where an intersection is not present on the straight-ahead line means a case where the intersection cannot be reached in the case where the vehicle moves straight in the travel direction. Thus, by defining an angle at which it can be considered that an intersection is present on the straight-ahead line as the reference angle, it is possible to prevent a sense of discomfort from being given to the driver by providing guidance on moving straight in the travel direction even if the intersection cannot be reached if the vehicle moves straight in the travel direction.

The display control means may determine that the degree of approach is less than the threshold in the case where a required period before the vehicle reaches the intersection is longer than a predetermined reference period. Consequently, guidance on traveling toward the target position that is present in the travel direction of the vehicle can be provided when the timing for the vehicle to reach an intersection is imminent and it is highly likely that the target position for entry into the intersection has been decided.

The display control means may cause the display section to display a forward image obtained by capturing the forward scene such that an optical axis is positioned on the straight-ahead line, and the display control means may set, as the position of superimposition of the guide image, a position on a bisector of the forward image in a lateral direction in the case where the degree of approach is equal to or more than the threshold. In the forward image captured with the optical axis positioned on the straight-ahead line, a position on the straight-ahead line corresponds to a position on the bisector in the lateral direction at all times. Thus, it is possible to prevent the forward image from being varied in the lateral direction at a position on the bisector of the forward image in the lateral direction in the case where the degree of approach is equal to or more than the threshold, which improves the viewability of the guide image.

The display control means may determine that the registered position is present on a left side or a right side with respect to the projected space in the case where an angle formed in a horizontal plane between a straight line extending from the vehicle to the registered position and the straight-ahead line is larger than a predetermined determination angle. Consequently, it is possible to easily determine whether or not the registered position is present on the left side or the right side with respect to the projected space. The determination angle may be set to the same angle, or may be set to different angles, for a case where the registered position is located on the left side with respect to the straight-ahead line and for a case where the registered position is located on the right side with respect to the straight-ahead line.

Further, the technique for providing guidance on the position of an intersection using a guide image in exemplary embodiments can also be implemented as a program or a method. In addition, it can be assumed that the system, program, and method described above are implemented as a single device, implemented by a plurality of devices, or implemented utilizing parts that are common to various portions provided in the vehicle, and the system, program, and method include a variety of aspects. For example, a navigation system, method, or program that includes the device described above can be provided. Various changes may be made. For example, some units may be implemented using software, and the others may be implemented using hardware. Further, the inventive principles may be implemented as a storage medium for a program that controls the system. As a matter of course, the storage medium for the software may totally equally be a magnetic storage medium, a magneto-optical storage medium, or any storage medium that may be developed in the future.

BRIEF DESCRIPTION OF THE DRAWINGS

FIG. 2A illustrates the relationship between a registered position and a current position, FIG. 2B illustrates a forward image, FIG. 2C is a plan view of a road, FIG. 2D illustrates an arrow image, and FIG. 2E illustrates a lower image.

FIGS. 3A and 3C illustrate the relationship between the registered position and the current position, FIGS. 3B and 3D illustrate the forward image, and FIG. 3E illustrates a reference angle.

EXEMPLARY EMBODIMENTS

Figure 1:
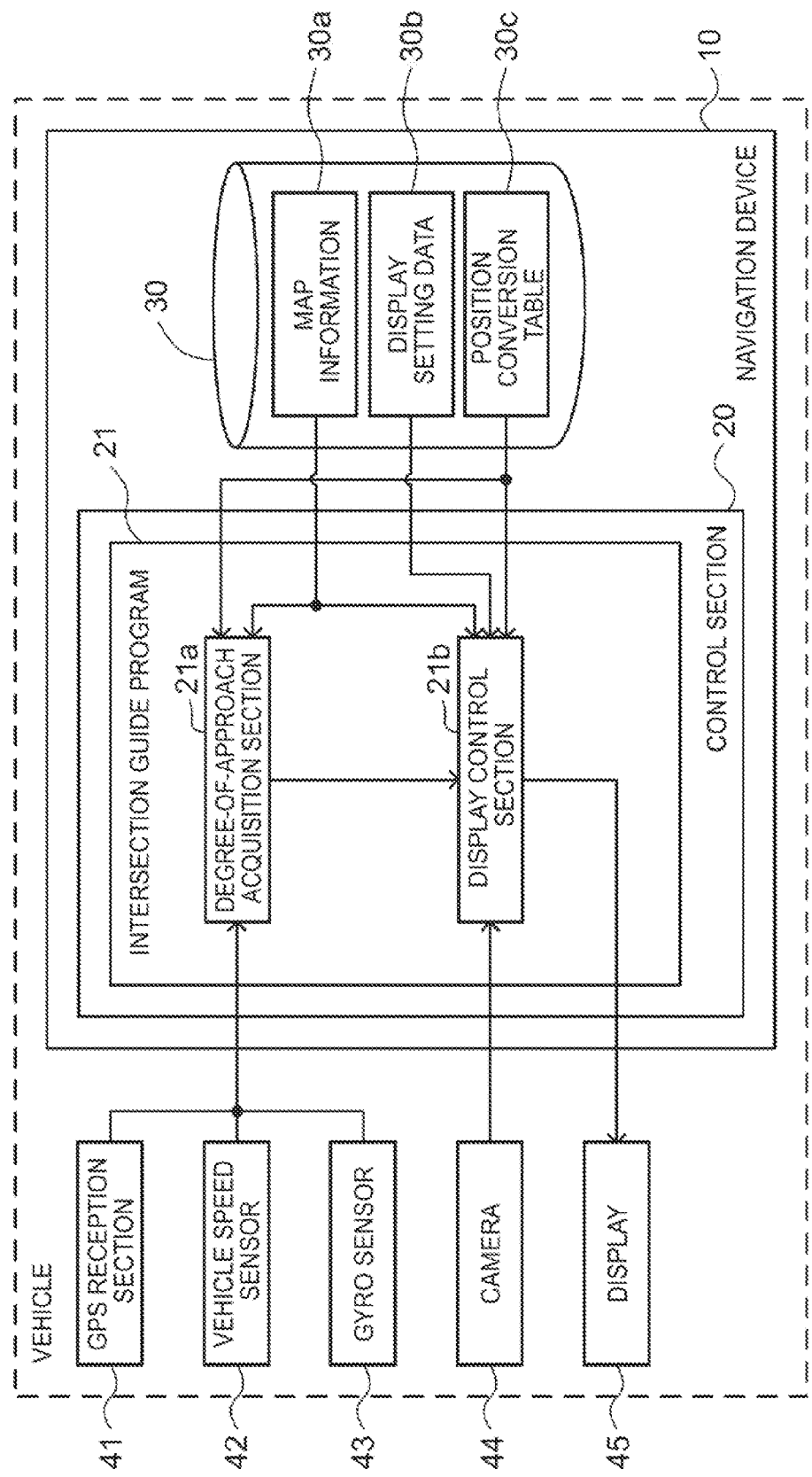
FIG. 1 is a block diagram of a navigation device.

An exemplary embodiment will be described below in the following order:
(1) Configuration of Navigation Device
  (1-1) First State
  (1-2) Second State
  (1-3) Third State
(2) Intersection Guide Process
(3) Other Embodiments 1. Configuration of Navigation Device FIG. 1 is a block diagram illustrating the configuration of a navigation device 10 serving as an intersection guide system according to an embodiment. The navigation device 10 is provided in a vehicle. The navigation device 10 includes a control section 20 and a storage medium 30. The control section 20 includes a CPU, a RAM, a ROM, etc., and executes a program stored in the storage medium 30 or the ROM. The storage medium 30 stores map information 30a, display setting data 30b, and a position conversion table 30c. (As used herein, the term "storage medium" is not intended to encompass transitory signals.)

The map information 30a includes node data indicating the position etc. of nodes set on roads, shape interpolation point data indicating the position etc. of shape interpolation points set on the center line of the roads between the nodes in the width direction, and link data indicating information on links that couple the nodes to each other. Nodes to which three or more links are connected correspond to intersections. The position of the node corresponding to the intersection means the registered position registered in the map information 30a as the position of the intersection. The link data include information indicating the width of the roads between the nodes, the number of lanes constituting the roads between the nodes, the position of partition lines between the lanes, and roads for exit from each lane at the nodes. The display setting data 30b are data including various types of setting information for displaying a guide image that provides guidance on an intersection. The display setting data 30b will be discussed in detail later.

The position conversion table 30c is a table that prescribes the correspondence between positions within a projected space ahead of the vehicle and projected positions within a forward image. The projected space is a part of a space ahead of the vehicle, and a space within the field of view of a camera 44 at the time when the camera 44 captures a forward scene ahead of the vehicle. The forward image is an image generated by the camera 44 by capturing the forward scene, and an image that represents the forward scene. The position conversion table 30c is prepared on the basis of the optical specifications (such as the field angle, the optical axis direction, and the imaging magnification) of the camera 44, and stored in advance in the storage medium 30. The control section 20 converts a desired position within the projected space using the position conversion table 30c to acquire a projected position at which an image of an object that is present at the desired position is projected within the forward image. Conversely, the control section 20 converts a desired position within the forward image using the position conversion table 30c to acquire the position of an object, an image of which is projected at the desired position, within the projected space.

The vehicle includes a GPS reception section 41, a vehicle speed sensor 42, a gyro sensor 43, a camera 44, and a display 45. The GPS reception section 41 receives radio waves from GPS satellites to output a signal for calculating the position of the vehicle via an interface (not illustrated). The vehicle speed sensor 42 outputs a signal corresponding to the rotational speed of wheels of the vehicle. The gyro sensor 43 outputs a signal corresponding to angular acceleration acting on the vehicle.

The camera 44 is an image sensor that captures a forward scene ahead of the vehicle to generate a forward image that represents the forward scene. The forward image generated by the camera 44 is output to the control section 20 via an interface (not illustrated). FIG. 2A is a plan view illustrating how the camera 44 captures a forward scene. The camera 44 has an optical system that is symmetric with respect to the optical axis in the horizontal direction. The view angles of the camera 44 toward the left and the right in the horizontal direction are each a determination angle $A_{th}$. The camera 44 is provided at the center position of the vehicle in the width direction. The optical axis of the camera 44 coincides with the travel direction of the vehicle. Thus, if the track followed by the vehicle moving straight ahead with the steering angle kept at 0° is defined by a straight-ahead line F, the optical axis of the camera 44 coincides with the straight-ahead line F as viewed in plan. A projected space K, which is a part of the space ahead of the vehicle projected on the forward image, is a space shaped to be symmetric with respect to the straight-ahead line F as viewed in plan. Specifically, the projected space K as viewed in plan is a space interposed between a left end line l, which is a straight line obtained by tilting the straight-ahead line F leftward by the determination angle $A_{th}$ about a current position P, and a right end line r, which is a straight line obtained by tilting the straight-ahead line F rightward by the determination angle $A_{th}$ about the current position P. The determination angle $A_{th}$ is half the view angle of the camera 44, and stored in the display setting data 30b.

FIG. 2B illustrates the forward image. The lateral direction in the forward image (horizontal direction in the forward image) corresponds to the width direction of the road and the lanes. The midpoint of the lower side of the forward image corresponds to the current position P of the vehicle (position of the camera 44). In addition, a position on the bisector of the forward image in the lateral direction corresponds to a position on the straight-ahead line F in the projected space K. In addition, an image of an object positioned farther forward from the vehicle on the road surface in the real space is positioned more above in the vertical direction of the forward image (up-down direction of the forward image). Further, a position on the side at the left end of the forward image corresponds to a position on the left end line l in the projected space K. A position on the side at the right end of the forward image corresponds to a position on the right end line l in the projected space K. In the position conversion table 30c, a coordinate (X, Y) indicating a position within the projected space K is represented by a viewpoint coordinate system, which is a coordinate system with the vehicle width direction defined as the X axis (positive toward the left and negative toward the right), with the vehicle travel direction defined as the Y axis, and with the current position P defined as the origin. A coordinate (0, Y) on the straight-ahead line F within the projected space K is converted using the position conversion table 30c into a position on the bisector of the forward image in the lateral direction.

The control section 20 specifies the current position P of the vehicle on the center line, in the width direction, of a travel road on which the vehicle is currently traveling through map matching known in the art on the basis of the signals output from the GPS reception section 41, the vehicle speed sensor 42, the gyro sensor 43, etc. and the map information 30a. Further, the control section 20 corrects the current position P in the width direction of the travel road on the basis of image recognition for the forward image. First, the control section 20 recognizes the position, within the forward image, of images of partition lines BL between the lanes constituting the travel road by performing a Hough transform known in the art or the like on the forward image. Then, the control section 20 specifies a travel lane, in which the vehicle is traveling, on the basis of the position of the images of the partition lines BL between the lanes in the forward image. For example, the control section 20 acquires the number of the images of the partition lines BL between the lanes positioned on the left side with respect to the bisector of the forward image in the lateral direction, and specifies the lane the acquired number from the left end of the travel road as the travel lane. Further, the control section 20 converts the position of the image of the partition line BL for the travel lane in the forward image using the position conversion table 30c to specify the distance from the partition line BL for the travel lane to the vehicle in the width direction of the travel road. Then, the control section 20 corrects the current position P in the width direction of the travel road on the basis of the position of the partition line BL for the travel lane based on the link data of the map information 30a and the distance from the partition line BL for the travel lane to the vehicle in the width direction of the travel road. In the following description, the current position P means the position after the correction unless specifically indicated otherwise. Further, the control section 20 specifies the travel direction of the vehicle on the basis of the output signal from the gyro sensor 43 etc.

The display 45 is a video output device that outputs various types of images including the forward image and the guide image on the basis of a video signal output from the control section 20. The forward image may be displayed on the entire display 45, or may be displayed on a part of the display 45.

The control section 20 executes an intersection guide program 21. The intersection guide program 21 includes a degree-of-approach acquisition section 21a and a display control section 21b. The degree-of-approach acquisition section 21a is a module that causes the control section 20 to execute a function of acquiring the degree of approach of the vehicle to an intersection that is present ahead of the vehicle. The control section 20 acquires the degree of approach of the vehicle to a guide intersection through which the vehicle travels next, among guide target intersections that are present on an expected travel path found through a search in advance. The expected travel path is constituted of a series of roads that the vehicle should travel on in order to reach the destination location. The expected travel path may be a path acquired by the control section 20 from an external device or a removable memory via communication or the like.

The control section 20 determines intersections for which the absolute value of a turning angle is equal to or more than a threshold as the guide target intersections. The turning angle (positive for a left turn and negative for a right turn) is formed by the direction (exit direction) of an exit road, which is a road on the expected travel path on which the vehicle travels immediately after an intersection is exited, with respect to the direction (entry direction) of an entry road, which is a road on the expected travel path on which the vehicle travels immediately before the intersection is entered. The control section 20 specifies the entry direction on the basis of a vector that extends from a shape interpolation point within the entry road that is the closest to a node corresponding to an intersection toward the node, and specifies the exit direction on the basis of a vector that extends from the node corresponding to the intersection toward a shape interpolation point within the exit road that is the closest to the node. FIG. 2C is a plan view illustrating how the vehicle approaches a guide intersection C. In FIG. 2C, the entry road $R_I$ and the exit road $R_O$, which form a turning angle of 90° at the guide intersection C, are roads on the expected travel path. In FIG. 2C, the partition lines BL between the lanes are indicated by a white broken or solid line, and a median strip M that separates roads with opposite travel directions for vehicles is indicated by a black solid line.

The control section 20, through the function of the degree-of-approach acquisition section 21a, acquires a registered position Q registered in the map information 30a as the position of the guide intersection C from the map information 30a. That is, the control section 20 acquires, from the node data of the map information 30a, the position of a node (node to which a link corresponding to the entry road $R_I$ and a link corresponding to the exit road $R_O$ are connected) set commonly on the entry road $R_I$ and on the exit road $R_O$ as the registered position Q. In the embodiment, a region on the road surface on which the entry road $R_I$ and the exit road $R_O$ overlap each other is the guide intersection C (within a frame of broken lines), and the registered position Q is set to the geometric center position (center of gravity) of the guide intersection C. Specifically, the guide intersection C is a region surrounded by extension lines $B_1$ and $B_2$ at both edges of the entry road $R_I$ in the width direction and extension lines $B_3$ and $B_3$ at both edges of the exit road $R_O$ in the width direction.

The control section 20, through the function of the degree-of-approach acquisition section 21a, acquires the linear distance between the registered position Q of the guide intersection C and the current position P as a remaining distance S. The remaining distance S is an index of the degree of approach of the vehicle to the guide intersection C. As the remaining distance S becomes shorter, the degree of approach of the vehicle to the guide intersection C becomes larger. The control section 20 may acquire the length of travel along the road from the current position of the vehicle to the registered position Q as the remaining distance S.

The display control section 21b is a module that superimposes a guide image that provides guidance on the position of the guide intersection C on the forward image and causes the display 45 to display the forward image on which the guide image is superimposed. As illustrated in FIG. 2B, the control section 20 generates a guide image G including a lower image $G_1$, an upper image $G_2$, and an arrow image $G_3$. The control section 20 generates the guide image G by superimposing the arrow image $G_3$ on the upper image $G_2$, and further coupling the upper end of the lower image $G_1$ to the lower end of the upper image $G_2$.

The images $G_1$ to $G_3$ will be described below. The control section 20 acquires a turning angle at the guide intersection C, and generates an arrow image $G_3$ corresponding to the turning angle. FIG. 2D illustrates the arrow image $G_3$. The arrow image G3 is composed of an entry portion I and an exit portion O that connects to the upper end of the entry portion I. The entry portion I is a portion that represents the travel direction (entry direction) of the vehicle on the entry road $R_I$. A center line i that bisects the entry portion I in the width direction is a line in the vertical direction of the forward image at all times. The entry direction immediately before entry into the guide intersection C on the entry road $R_I$ is forward at all times, and corresponds to the upward direction in the vertical direction of the forward image. Thus, the entry portion I, the center line i of which in the width direction is a line in the vertical direction of the forward image, represents the direction of entry of the vehicle into the guide intersection C. The exit portion O is a portion that represents the travel direction (exit direction) of the vehicle on the exit road $R_O$. A center line o that bisects the exit portion O in the width direction is a line in a direction tilted by a turning angle θ with respect to the center line i of the entry portion I in the width direction. An arrow head portion is provided at the distal end of the exit portion O.

As illustrated in FIG. 2B, the control section 20 generates a rectangular upper image $G_2$, the height and the width of which are larger than those of the arrow image $G_3$ by a predetermined amount, and superimposes the arrow image $G_3$ on the upper image $G_2$. Then, the control section 20 acquires the size of the upper image $G_2$, which corresponds the remaining distance S, in the display setting data 30b, and resizes (enlarges or reduces) the upper image $G_2$ on which the arrow image $G_3$ is superimposed to a size matching the remaining distance S. In the display setting data 30b, the size of the upper image $G_2$ is prescribed so as to become larger as the remaining distance S becomes shorter.

FIG. 2E illustrates the lower image $G_1$. The lower image $G_1$ is an isosceles triangular image having an upper side corresponding to a line in the lateral direction in the forward image and a vertex (lower end point) located below the upper side. That is, the lower image $G_1$ is an image that becomes narrower toward the lower end point. The control section 20 acquires a length Z of the lower image $G_1$, which corresponds to the remaining distance S, in the display setting data 30b, and generates a lower image G1 having the acquired length Z. The length Z of the lower image $G_1$ is the length of the lower image $G_1$ in the vertical direction of the forward image. In the display setting data 30b, the length Z of the lower image $G_1$ is prescribed so as to become smaller as the remaining distance S becomes shorter. The control section 20 generates a guide image G by coupling the upper end (upper side) of the lower image $G_1$ to the lower end of the upper image $G_2$, on which the arrow image $G_3$ is superimposed, such that a center line c of the lower image $G_1$ in the lateral direction is present on an extension line U of the center line i of the entry portion I of the arrow image $G_3$ in the lateral direction. Consequently, the lower end point of the lower image $G_1$ is also positioned on the extension line U of the center line i of the entry portion I of the arrow image $G_3$ in the lateral direction.

In superimposing the guide image G described above on the forward image, the control section 20 sets the position of superimposition of the lower end point of the lower image $G_1$ of the guide image G on the forward image. In the embodiment, the control section 20 sets the position of superimposition of the lower end point of the lower image $G_1$ of the guide image G using different methods in accordance with the state (first to third states) of the positional relationship between the guide intersection C and the vehicle.

1-1. First State

The control section 20, through the function of the display control section 21b, determines that the positional relationship between the guide intersection C and the vehicle is in a first state in the case where the degree of approach is less than a threshold and the registered position Q of the guide intersection C is present within the projected space K for the forward image. The control section 20, through the function of the display control section 21b, determines that the degree of approach is less than the threshold in the case where the remaining distance S from the vehicle to the registered position Q of the guide intersection C is longer than a predetermined reference distance $S_{th}$. In the embodiment, the reference distance $S_{th}$ is set to the remaining distance S from the vehicle to an intersection in the average shape at the time when the area of an image of the intersection in the average shape is a predetermined area in the forward image, and stored in the display setting data 30b. In the case where the image of the intersection in the average shape has the predetermined area in the forward image, it is experimentally confirmed that the shape of a connected road connected to the intersection in the average shape can be recognized, and that the lane configuration of the entry road for entry into the intersection in the average shape can be recognized. The intersection in the average shape is an intersection having a shape obtained by averaging the shapes of intersections that are present on roads. For example, the intersection in the average shape may have the shape of a square, the length of the four sides of which equals the average width of roads.

The control section 20, through the function of the display control section 21b, determines whether or not the registered position Q of the guide intersection C is present within the projected space K as follows. That is, in the case where an intersection angle A, which is the angle formed in a horizontal plane between the straight line extending from the current position P to the registered position Q of the guide intersection C and the straight-ahead line F, is equal to or less than a determination angle $A_{th}$, the control section 20 determines that the registered position Q of the guide intersection C is present within the projected space K. For example, the control section 20 may acquire a coordinate $(X_Q, Y_Q)$ indicating the registered position Q in the viewpoint coordinate system as illustrated in FIG. 2A, and determine that the registered position Q of the guide intersection C is present within the projected space K in the case where the coordinate $(X_Q, Y_Q)$ meets the relationship "tan $A_{th} \geq \tan A = |X_Q|Y_Q$. The coordinate $(X_Q, Y_Q)$ of the registered position Q in the viewpoint coordinate system can be acquired by offsetting the coordinate of the registered position Q on the map such that the current position P corresponds to the origin, and further rotating the offset coordinate of the registered position Q in accordance with the travel direction of the vehicle about the current position P.

As illustrated in FIGS. 2A and 2C, in the case where the current position P is $P_2$, it is determined that the remaining distance S is longer than the reference distance $S_{th}$, and that the intersection angle A is equal to or less than the determination angle $A_{th}$. In this case, it is determined that the positional relationship between the guide intersection C and the vehicle is in the first state.

In the first state, the control section 20, through the function of the display control section 21b, sets, as the position of superimposition of the lower end point of the lower image $G_1$ of the guide image G, the position within the forward image which corresponds to the registered position Q registered in the map information as the position of the guide intersection C. The control section 20 acquires the position within the forward image, which corresponds to the registered position Q, by converting the coordinate $(X_Q, Y_Q)$ of the registered position Q in the viewpoint coordinate system using the position conversion table 30c, and sets the acquired position as the position of superimposition of the lower end point of the lower image $G_1$ of the guide image G. Then, the control section 20 superimposes the guide image G on the forward image such that the lower end point of the lower image $G_1$ of the guide image G is superimposed on the position within the forward image, which corresponds to the registered position Q. Further, the control section 20 causes the display 45 to display the forward image on which the guide image G is superimposed.

FIG. 2B illustrates a forward image in the first state. As illustrated in FIG. 2B, in the case where the degree of approach is less than the threshold, the driver can recognize the position of the guide intersection C in reliance on the position of the lower end point of the lower image $G_1$ of the guide image G.

1-2. Second State

In the case where it is determined in the determination discussed above that the remaining distance S is longer than the reference distance $S_{th}$ and that the intersection angle A is larger than the determination angle $A_{th}$, the control section 20, through the function of the display control section 21b, determines that the positional relationship between the guide intersection C and the vehicle is in a second state. FIG. 3A illustrates the positional relationship in the viewpoint coordinate system between the guide intersection C and the vehicle in the second state. As illustrated in FIGS. 2C and 3A, in the case where the current position P is $P_1$, it is determined that the remaining distance S is longer than the reference distance $S_{th}$, and that the intersection angle A is larger than the determination angle $A_{th}$.

In the second state, the control section 20 determines whether the registered position Q of the guide intersection C is present on the left side with respect to the projected space K, or whether the registered position Q of the guide intersection C is present on the right side with respect to the projected space K. In the second state, the control section 20 determines that the registered position Q of the guide intersection C is present on the left side with respect to the projected space K if the X coordinate ($X_Q$) of the registered position Q in the viewpoint coordinate system is positive, and determines that the registered position Q of the guide intersection C is present on the right side with respect to the projected space K if the X coordinate ($X_Q$) of the registered position Q is negative. As illustrated in FIG. 3A, in the case where the current position P is $P_1$, it is determined that the registered position Q of the guide intersection C is present on the left side with respect to the projected space K.

In the case where the registered position Q of the guide intersection C is present on the left side with respect to the projected space K, the control section 20, through the function of the display control section 21b, sets, as the position of superimposition of the lower end point of the lower image $G_1$ of the guide image G, the position within the forward image, which corresponds to a position (end position N) at the left end within the projected space K. That is, as illustrated in FIG. 3A, the control section 20 acquires the end position N on the left end line l, which is present at the left end of the projected space K, and sets the position within the forward image, which corresponds to the end position N, as the position of superimposition of the lower end point of the lower image $G_1$ of the guide image G. In the embodiment, the control section 20 causes the distance in the travel direction of the vehicle between the current position P and the registered position Q of the guide intersection C and the distance in the travel direction of the vehicle between the current position P and the end position N to coincide with each other. That is, the control section 20 causes the Y coordinate ($Y_N$) of the end position N at the left end of the projected space K to coincide with the Y coordinate ($Y_Q$) of the registered position Q, and sets the X coordinate ($X_N$) of the end position N on the left side such that "$\tan A_{th} = X_N/Y_Q$" is met.

In the case where the registered position Q of the guide intersection C is present on the right side with respect to the projected space K, on the other hand, the control section 20, through the function of the display control section 21b, sets, as the position of superimposition of the lower end point of the lower image $G_1$ of the guide image G, the position within the forward image, which corresponds to a position (end position N) at the right end within the projected space K. That is, the control section 20 acquires the end position N on the right end line r, which is present at the right end of the projected space K, and sets the position within the forward image, which corresponds to the end position N, as the position of superimposition of the lower end point of the lower image $G_1$ of the guide image G. In the embodiment, the control section 20 causes the Y coordinate ($Y_N$) of the end position N at the right end of the projected space K to coincide with the Y coordinate ($Y_Q$) of the registered position Q, and sets the X coordinate ($X_N$) of the end position N on the right side such that "$\tan(-A_{th}) = X_N/Y_Q$" is met.

In the second state, the control section 20, through the function of the display control section 21b, acquires the position within the forward image, which corresponds to the end position N, by converting the coordinate ($X_N$, $Y_N$) of the end position N of the projected space K in the viewpoint coordinate system using the position conversion table 30c, and sets the acquired position as the position of superimposition of the lower end point of the lower image $G_1$ of the guide image. Then, the control section 20 superimposes the guide image G on the forward image such that the lower end point of the lower image $G_1$ of the guide image G is superimposed on the position within the forward image, which corresponds to the end position N of the projected space K. Further, the control section 20 causes the display 45 to display the forward image on which the guide image G is superimposed.

In the second state, the position of superimposition of the lower end point of the lower image $G_1$ of the guide image G is set on a side at an end of the forward image in the lateral direction at all times. In this case, in the case where the lower end point of the lower image $G_1$ is positioned on the extension line U of the center line i of the entry portion I of the arrow image $G_3$ in the lateral direction as illustrated in FIG. 2B, the guide image G lies off the forward image on one of the left and right sides. Also in the case where the position of superimposition of the lower end point of the lower image $G_1$ of the guide image G is set around an end of the forward image in the lateral direction in the first state, in addition, the guide image G lies off the forward image on one of the left and right sides. Specifically, in the case where a distance $e_1$ (FIG. 2B) in the lateral direction from the center line i of the entry portion I of the arrow image $G_3$ to the left end of the guide image G is longer than a distance $h_1$ (FIG. 2B) in the lateral direction from the position within the forward image, which corresponds to the registered position Q, to the left end of the forward image, the guide image G lies off the forward image on the left side. In such a case, the control section 20 moves the position of superimposition of the upper image $G_2$ on which the arrow image $G_3$ is superimposed rightward such that the left end of the upper image $G_2$ of the guide image G coincides with the left end of the forward image while maintaining the position of superimposition of the lower end point of the lower image $G_1$ of the guide image G. As illustrated in FIG. 3B, the control section 20 may incline the lower image $G_1$ such that the position at which the upper end of the lower image $G_1$ is coupled to the lower end of the upper image $G_2$ is not varied. In this case, the lower image $G_1$ is not an isosceles triangular image. In the case where a distance $e_2$ (FIG. 2B) in the lateral direction from the center line i of the entry portion I of the arrow image $G_3$ to the right end of the guide image G is longer than a distance $h_2$ (FIG. 2B) in the lateral direction from the position within the forward image, which corresponds to the registered position Q, to the right end of the forward image, on the other hand, the control section 20 may move the position of superimposition of the upper image $G_2$ leftward such that the right end of the upper image $G_2$ of the guide image G coincides with the right end of the forward image.

As described above, it is possible to recognize whether the guide intersection C is located on the left side with respect to the projected space K, or whether the guide intersection C is located on the right side with respect to the projected space K, by providing guidance on the position of an end on the side on which the registered position Q of the guide intersection C is present in the forward image in the case where the registered position Q is located outside the projected space K. Since guidance on the position at an end on the side on which the registered position Q of the guide intersection C is present in the forward image is provided, guidance on a position that is as close to the guide intersection C as possible can be provided. In addition, the control section 20 can easily determine whether or not the registered position Q is present outside the projected space K by determining whether or not the intersection angle A formed in a horizontal plane between the straight line extending from the current position P to the registered position Q and the straight-ahead line F is larger than the predetermined determination angle $A_{th}$.

1-3. Third State

In the case where it is determined in the determination discussed above that the remaining distance S is equal to or less than the reference distance $S_{th}$, the control section 20, through the function of the display control section 21b, determines that the positional relationship between the guide intersection C and the vehicle is in a third state. As illustrated in FIG. 2C, in the case where the current position P is $P_3$, the remaining distance S is equal to or less than the reference distance $S_{th}$.

FIG. 3C illustrates how the position of superimposition of the lower end point of the lower image $G_1$ of the guide image G is set in the third state in the viewpoint coordinate system. In the third state, the control section 20, through the function of the display control section 21b, sets, as the position of superimposition of the lower end point of the lower image $G_1$ of the guide image G, the position within the forward image, which corresponds to the position (straight-ahead position V) on the straight-ahead line F that is a straight line extending in the travel direction of the vehicle from the vehicle. The control section 20 sets the straight-ahead position V on the straight-ahead line F by setting the X coordinate ($X_V$) of the straight-ahead position V in the viewpoint coordinate system to 0. In the embodiment, the control section 20 causes the distance in the travel direction of the vehicle between the current position P and the registered position Q of the guide intersection C and the distance in the travel direction of the vehicle between the current position P and the straight-ahead position V to coincide with each other. That is, the control section 20 causes the Y coordinate ($Y_V$) of the straight-ahead position V in the viewpoint coordinate system to coincide with the Y coordinate ($Y_Q$) of the registered position Q.

In the third state, the control section 20, through the function of the display control section 21b, acquires the position within the forward image, which corresponds to the straight-ahead position V, by converting the coordinate ($X_V$, $Y_V$) of the straight-ahead position V on the straight-ahead line F in the viewpoint coordinate system using the position conversion table 30c, and sets the acquired position as the position of superimposition of the lower end point of the lower image $G_1$ of the guide image G. As discussed above, the coordinate ($X_V$, $Y_V$)=(0, $Y_Q$) on the straight-ahead line F is converted using the position conversion table 30c into a position on the bisector of the forward image in the lateral direction. Then, the control section 20 superimposes the guide image G on the forward image such that the lower end point of the lower image $G_1$ of the guide image G is superimposed on the position within the forward image, which corresponds to the straight-ahead position V on the straight-ahead line F. Further, the control section 20 causes the display 45 to display the forward image on which the guide image G is superimposed. As illustrated in FIG. 3D, the lower end point of the lower image $G_1$ of the guide image G is positioned on the bisector of the forward image in the lateral direction, and the center line i of the entry portion I of the arrow image $G_3$ in the lateral direction is also positioned on the bisector of the forward image in the lateral direction.

As illustrated in FIG. 3D, in the case where the degree of approach to the guide intersection C is large, the driver can clearly visually recognize an image of the guide intersection C within the forward image or the real scene. As in the embodiment, in the case where the vehicle approaches the guide intersection C at which the arrow image $G_3$ provides guidance on making a left turn (turning angle T=90°), the driver can decide the position through which the guide intersection C is entered from a left-turn lane as the target position on the basis of the image of the guide intersection C clearly visually recognized, and cause drive the vehicle toward the target position. In this way, in the case where the driver drives the vehicle toward the target position at the guide intersection C, the control section 20 provides guidance on the straight-ahead position V on the straight-ahead line F extending in the travel direction of the vehicle from the vehicle as the position of the guide intersection C. By providing guidance on the straight-ahead position V on the straight-ahead line F, it is possible to provide guidance on driving the vehicle in the travel direction toward the target position decided in advance by the driver. For example, it is possible to provide guidance on traveling in the left turn lane as illustrated in FIG. 3D. That is, it is possible to prevent giving a sense of discomfort as if the vehicle must make a left turn at the guide intersection C by way of the center position of the guide intersection C by providing guidance on the registered position Q that is the center position of the guide intersection C as indicated by the broken line in FIG. 3D.

In the forward image captured with the optical axis positioned on the straight-ahead line F, in addition, the straight-ahead position V on the straight-ahead line F corresponds to a position on the bisector in the lateral direction at all times. Therefore, it is possible to prevent the guide image G from being varied in the lateral direction, which improves the viewability of the guide image G. In the embodiment, further, the guide image G is generated such that the center line of the lower image $G_1$ in the lateral direction is present on the extension line U of the center line i of the entry portion I of the arrow image $G_3$ in the lateral direction. That is, the center line i of the entry portion I of the arrow image $G_3$ in the lateral direction and the center line c of the lower image $G_1$ in the lateral direction are arranged to form one straight line on the bisector of the forward image in the lateral direction, which corresponds to the straight-ahead line F. Consequently, it is possible to allow the driver to intuitively recognize that the guide intersection C can be entered by driving the vehicle straight ahead in the travel direction represented by the extension line U. Further, even if the positional relationship between the guide intersection C and the vehicle is in any state (any of the first to third states), the lower end point of the lower image $G_1$ of the guide image G is superimposed on the position of superimposition, which is obtained by converting the Y coordinate ($Y_Q=Y_N=Y_V$) of the registered position Q in the viewpoint coordinate system using the position conversion table 30c. Thus, it is possible to prevent the lower end point of the lower image $G_1$ of the guide image G from abruptly moving in the vertical direction of the guide image G when the state of the positional relationship between the guide intersection C and the vehicle is varied, which prevents giving a sense of discomfort.

2. Intersection Guide Process

Figure 4:
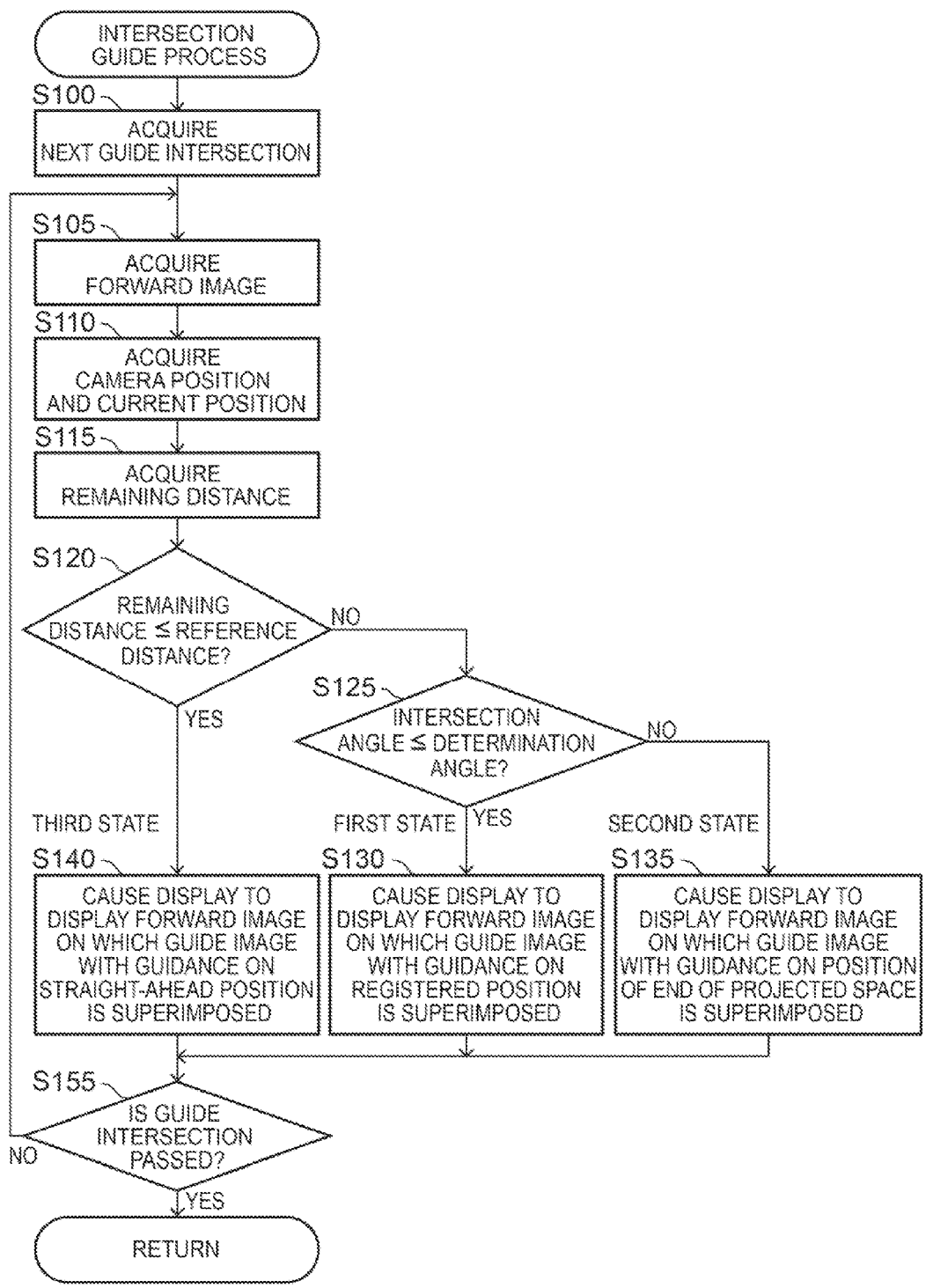
FIG. 4 is a flowchart of an intersection guide process.

FIG. 4 is a flowchart of an intersection guide process. The intersection guide process is a process for updating display on the display 45 each time the latest forward image is captured. First, the control section 20, through the function of the degree-of-approach acquisition section 21a, acquires a guide intersection C through which the vehicle travels next (step S100). That is, the control section 20 acquires a guide intersection C through which the vehicle is expected to travel next on the expected travel path, among intersections, the absolute value of the turning angle T at which is equal to or more than a threshold. The turning angle T is the angle formed by the exit direction with respect to the entry direction. Next, the control section 20, through the function of the degree-of-approach acquisition section 21a, acquires a forward image (step S105). Next, the control section 20, through the function of the degree-of-approach acquisition section 21a, acquires the current position P and the travel direction of the vehicle (step S110).

Next, the control section 20, through the function of the degree-of-approach acquisition section 21a, acquires a remaining distance S to the guide intersection C (step S115). That is, the control section 20 acquires the linear distance from the current position P to the registered position Q set to the center position of the guide intersection C as the remaining distance S.

Next, the control section 20, through the function of the display control section 21b, determines whether or not the remaining distance S to the registered position Q is equal to or less than the reference distance $S_{th}$ (step S120). That is, the control section 20 determines whether or not the degree of approach to the guide intersection C is equal to or more than the threshold. In the case where it is not determined that the remaining distance S to the registered position Q is equal to or less than the reference distance $S_{th}$ (step S120: N), the control section 20, through the function of the display control section 21b, determines whether or not the intersection angle A formed in a horizontal plane between the straight line extending from the current position P to the registered position Q and the straight-ahead line F is equal to or less than the determination angle $A_{th}$ (step S125). That is, the control section 20 determines whether or not the registered position Q of the guide intersection C is present within the projected space K. Specifically, the control section 20 acquires a coordinate ($X_Q$, $Y_Q$) of the registered position Q in the viewpoint coordinate system, and determines that the registered position Q of the guide intersection C is present within the projected space K in the case where the coordinate ($X_Q$, $Y_Q$) meets the relationship "$\tan A_{th} \geq \tan A = |X_Q|/Y_Q$".

Then, in the case where it is determined that the intersection angle A is equal to or less than the determination angle $A_{th}$ (step S125: Y), the control section 20, through the function of the display control section 21b, causes the display 45 to display a forward image on which a guide image G that provides guidance on the registered position Q is superimposed (step S130). That is, in the case where the positional relationship between the guide intersection C and the vehicle is in the first state, the control section 20 sets the position of superimposition of the lower end point of the lower image $G_1$ of the guide image G to the position within the forward image, which corresponds to the registered position Q of the guide intersection C of the guide intersection C. Specifically, the control section 20 acquires the position within the forward image, which corresponds to the registered position Q, by converting the coordinate ($X_Q$, $Y_Q$) of the registered position Q in the viewpoint coordinate system using the position conversion table 30c, and sets the acquired position as the position of superimposition of the lower end point of the lower image $G_1$ of the guide image G.

The control section 20 superimposes the arrow image $G_3$ representing the turning angle T at the guide intersection C on the upper image $G_2$, and changes the size of the upper image $G_2$ on which the arrow image $G_3$ is superimposed to a size corresponding to the remaining distance S. Further, the control section 20 generates an isosceles triangular lower image G1 having a length Z corresponding to the remaining distance S in the vertical direction of the forward image. Then, the control section 20 generates a guide image G by coupling the upper end (upper side) of the lower image $G_1$ to the lower end of the upper image $G_2$, on which the arrow image $G_3$ is superimposed, such that the center line c of the lower image $G_1$ in the lateral direction is present on the extension line U of the center line i of the entry portion I of the arrow image $G_3$ in the lateral direction. It should be noted, however, that in the case where the guide image G lies off the forward image on one of the left and right sides, the control section 20 moves the position of superimposition of the upper image $G_2$ on which the arrow image $G_3$ is superimposed in the lateral direction such that the left end or the right end of the upper image $G_2$ of the guide image G coincides with the left end or the right end of the forward image. The control section 20 superimposes the guide image G on the forward image such that the lower end point of the lower image $G_1$ is superimposed on the position within the forward image, which corresponds to the registered position Q of the guide intersection C of the guide intersection C, and causes the display 45 to display the forward image on which the guide image G is superimposed (FIG. 2B).

In the case where it is not determined that the intersection angle A is equal to or less than the determination angle $A_{th}$ (step S125: N), on the other hand, the control section 20, through the function of the display control section 21b, causes the display 45 to display a forward image on which a guide image G that provides guidance on the end position of the projected space K is superimposed (step S135). That is, in the case where the positional relationship between the guide intersection C and the vehicle is in the second state, the control section 20 sets the position of superimposition of the lower end point of the lower image $G_1$ of the guide image G to the position within the forward image, which corresponds to the end position N at an end of the projected space K. Specifically, in the case where the registered position Q of the guide intersection C is present on the left side with respect to the projected space K, the control section 20 acquires an end position N on the left end line l, which is present at the left end of the projected space K, and sets the position within the forward image, which corresponds to the end position N, as the position of superimposition of the lower end point of the lower image $G_1$ of the guide image G. That is, the control section 20 causes the Y coordinate ($Y_N$) of the end position N at the left end of the projected space K to coincide with the Y coordinate ($Y_Q$) of the registered position Q, and sets the X coordinate ($X_N$) of the end position N on the left side such that "$\tan A_{th} = X_N/Y_Q$" is met. In the case where the registered position Q of the guide intersection C is present on the right side with respect to the projected space K, on the other hand, the control section 20, through the function of the display control section 21b, acquires an end position N on the right end line r, which is present at the right end of the projected space K, and sets the position within the forward image, which corresponds to the end position N, as the position of superimposition of the lower end point of the lower image $G_1$ of the guide image G. That is, the control section 20 causes the Y coordinate ($Y_N$) of the end position N at the right end of the projected space K to coincide with the Y coordinate ($Y_Q$) of the registered position Q, and sets the X coordinate ($X_N$) of the end position N on the right side such that "$\tan(-A_{th}) = X_N/Y_Q$" is met.

Then, the control section 20 sets, as the position of superimposition of the lower end point of the lower image $G_1$ of the guide image G, the position obtained by converting the coordinate ($X_N$, $Y_N$) of the end position N of the projected space K using the position conversion table 30c. Further, the control section 20 moves the position of superimposition of the upper image $G_2$ on which the arrow image $G_3$ is superimposed in the lateral direction such that the left end or the right end of the upper image $G_2$ of the guide image G coincides with the left end or the right end of the forward image. The control section 20 superimposes the guide image G on the forward image such that the lower end point of the lower image $G_1$ is superimposed on the position within the forward image, which corresponds to the end position N at an end of the projected space K, and causes the display 45 to display the forward image on which the guide image G is superimposed (FIG. 3B).

In the case where it is determined that the remaining distance S to the registered position Q is equal to or less than the reference distance $S_{th}$ (step S120: Y), on the other hand, the control section 20, through the function of the display control section 21b, causes the display 45 to display a forward image on which a guide image G that provides guidance on the straight-ahead position V on the straight-ahead line F is superimposed (step S140). The straight-ahead line F is a straight line extending in the travel direction of the vehicle from the vehicle. That is, in the case where the positional relationship between the guide intersection C and the vehicle is in the third state, the control section 20 sets the position of superimposition of the lower end point of the lower image $G_1$ of the guide image G to the position within the forward image, which corresponds to the straight-ahead position V on the straight-ahead line F. Specifically, the control section 20 acquires, as the straight-ahead position V, a coordinate (0, $Y_Q$), the Y coordinate ($Y_V$) of which coincides with the Y coordinate ($Y_Q$) of the registered position Q in the viewpoint coordinate system and which is present on the straight-ahead line F. Then, the control section 20 acquires the position within the forward image, which corresponds to the straight-ahead position V, by converting the coordinate (0, $Y_Q$) of the straight-ahead position V using the position conversion table 30c, and sets the acquired position as the position of superimposition of the lower end point of the lower image $G_1$ of the guide image G. The position within the forward image, which corresponds to the straight-ahead position V, is a position on the bisector of the forward image in the lateral direction at all times. The control section 20 superimposes the guide image C on the forward image such that the lower end point of the lower image $G_1$ is superimposed on the position within the forward image, which corresponds to the straight-ahead position V (FIG. 3D), and causes the display 45 to display the forward image on which the guide image C is superimposed In the embodiment, in any of the first to third states, the position of superimposition of the lower end point of the lower image $G_1$ of the guide image G is set so as to maintain the Y coordinate ($Y_Q$) of the registered position Q. Consequently, it is possible to prevent the position of superimposition of the lower end point of the lower image $G_1$ of the guide image G from being significantly varied in the vertical direction of the forward image when the positional relationship between the current position P and the registered position Q of the guide intersection C transitions in state (first to third states), which improves the viewability of the lower end point of the lower image $G_1$ of the guide image G.

3. Other Embodiments

The control section 20 may specify the size of the guide intersection C on the basis of the width of the entry road $R_I$ and the width of the exit road $R_O$, which are indicated by the link data of the map information 30a, and upwardly revise the reference distance $S_{th}$ in the case where the guide intersection C is larger than the intersection in the average shape and downwardly revise the reference distance $S_{th}$ in the case where the guide intersection C is smaller than the intersection in the average shape. Further, the reference distance $S_{th}$ may be set to the remaining distance S at the time when an image of the intersection in the average shape has a predetermined length in the lateral direction in the forward image. If an image of an intersection has a somewhat large length in the lateral direction, the lane configuration of the entry road in which images of lanes are arranged in the lateral direction in the forward image can be clearly visually recognized. That is, a transition can be made to the third state when the lane configuration of the entry road $R_1$ can be clearly visually recognized. In addition, the reference distance $S_{th}$ may be set to the remaining distance S at the time when an image of the intersection in the average shape has a predetermined length in the vertical direction in the forward image. If an image of an intersection has a somewhat large length in the vertical direction, an image of a connected road (exit road $R_O$) other than the straight road, the width of which is indicated in the vertical direction of the forward image, can be clearly visually recognized. That is, a transition can be made to the third state when the shape of the exit road $R_O$ and the exit direction can be clearly visually recognized. As a matter of course, the visibility of the guide intersection C is varied in accordance with the time period (daytime or nighttime) and the weather, and therefore the distance at which the guide intersection C can be clearly visually recognized may be determined by setting the reference distance $S_{th}$ in accordance with the time period and the weather.

Further, the control section 20, through the function of the display control section 21b, may determine that the degree of approach is less than the threshold in the case where the intersection angle A formed in a horizontal plane between the straight line extending from the vehicle to the registered position Q and the straight-ahead line F is larger than a predetermined reference angle. For example, the reference angle may be set to such an angle that it can be considered that the guide intersection C is present on the straight-ahead line F. As illustrated in FIG. 3E, it may be assumed that an intersection in the average shape is present at the position at which the distance to the registered position Q is the remaining distance S, and the largest angle at which the straight-ahead line F passes through the intersection in the average shape may be determined as a reference angle H. In the example of FIG. 3E, it is assumed that an intersection having the shape of a circle having a radius of an average width W of roads is the intersection in the average shape, and the reference angle H is set such that "sin H=W/S" is met. Consequently, it is possible to prevent a sense of discomfort from being given to the driver by providing guidance on moving straight in the travel direction even if the guide intersection C cannot be reached if the vehicle moves straight in the travel direction. In the case of FIG. 3E, the reference angle H becomes larger as the remaining distance S becomes shorter. Further, the reference angle H may be set on the basis of the size of the guide intersection C, rather than the size of the intersection in the average shape.

The control section 20, through the function of the degree-of-approach acquisition section 21a, may acquire a degree of approach that becomes larger as a required period before an intersection is reached becomes shorter. For example, the control section 20 may acquire a value obtained by dividing the remaining distance S by the vehicle speed as the required period before an intersection is reached, and determine that the degree of approach is less than a threshold in the case where the required period is longer than a reference period. That is, the control section 20 may determine that the degree of approach is equal to or more than the threshold in the case where the required period is equal to or less than the reference period. Consequently, guidance on traveling toward the target position that is present in the travel direction of the vehicle can be provided when the timing for the vehicle to reach an intersection is imminent and it is highly likely that the target position for entry into the intersection has been decided. The control section 20 may acquire a required period on the basis of the vehicle speed based on the output signal from the vehicle speed sensor 42, or may acquire a required period on the basis of a vehicle speed limit of the entry road $R_1$ indicated by the link data. The guide image G may be a point-like image, the entirety of which is superimposed on the set position of superimposition, or may be a polygonal-line image, a bent point of which is superimposed on the set position of superimposition. The guide image G to be superimposed on the forward scene in the case where the degree of approach is less than a threshold may be the same in size as, or may be different in size from, the guide image G to be superimposed on the forward scene in the case where the degree of approach is equal to or more than the threshold. For example, the color or the shape of the guide image G may be varied when a transition is made from the first state to the third state to allow recognition of the degree of approach to the guide intersection C. Further, the color or the shape of the guide image G may be varied when a transition is made from the second state to the first state to allow recognition that an image of the guide intersection C has become visually recognizable within the forward image.

The registered position Q may not necessarily be a position registered as the position of an intersection in the map information 30a, and may be a position that can be derived on the basis of only data registered in the map information 30a. For example, the control section 20 may acquire the width of a connected road connected to an intersection on the basis of the link data of the map information 30a, and derive the registered position Q on the basis of the width of the connected road. In addition, the registered position Q may not be a center position of a region in which the entry road $R_1$ and the exit road $R_O$ intersect each other, and may be a center position D (FIG. 2C) of a region in which the entry road $R_1$ and the exit road $R_O$ and opposite roads, on which vehicles travel opposite to vehicles that travel on the entry road $R_1$ and the exit road $R_O$, intersect each other. In the third state, the control section 20, though the function of the display control section 21b, may set a position within the forward scene, which corresponds to any position on the straight-ahead line F, as the position of superimposition of the guide image G. For example, the control section 20 may set a position on the straight-ahead line F and before an intersection as the position of superimposition of the guide image G.

The reference distance $S_{th}$ may be set to a remaining distance S at which it can be considered that the vehicle has entered an extended section provided before an intersection and provided with an extended lane such as a right-turn lane. This is because the vehicle cannot travel on the extended lane in a section before the lane extended section even if the driver recognizes that the target position can be reached by traveling straight in the extended lane, and the target position may not be present on the straight-ahead line F. Alternatively, the reference distance $S_{th}$ may be set to a remaining distance S at which it can be considered that the vehicle has entered a section which is provided before an intersection and in which a lane change is prohibited. Consequently, it is possible to provide the driver with guidance on maintaining the current travel direction without making a lane change in the section in which a lane change is prohibited. Still alternatively, the reference distance $S_{th}$ may be set to a remaining distance S at which it can be considered that an image of a road sign (arrow) drawn on the road surface before an intersection to indicate the direction for exit for each lane can be visually recognized.

In the embodiment, the forward image may be obtained by drawing a forward scene on the basis of the map information 30a. In the case where the forward scene is drawn on the basis of the map information 30a, the guide image G together with the forward image may be drawn. Here, superimposing the guide image G on the forward scene and causing the display 45 to display the forward scene on which the guide image G is superimposed may correspond to causing the display 45 to display the guide image G to result in superimposition of the guide image G on the forward scene. For example, the display 45 may display at least the guide image G, and may not display the forward image. That is, the display 45 may superimpose the guide image G on the actual forward scene that the driver visually recognizes over the windshield of the vehicle. For example, the display 45 may be a semi-transmissive type that allows the actual forward scene to be seen through the display 45 so that the guide image G is superimposed on the actual forward scene. In the case where the actual forward scene is projected on a semi-transmissive display section, the projected space K means a space that can be visually recognized by the driver through the display 45. The angle formed between the direction of the line of sight of the driver looking right ahead and the direction of the line of sight of the driver looking at the left end of the display 45 from the viewpoint of the driver is determined as the determination angle $A_{th}$ to the left. Similarly, the angle formed between the direction of the line of sight of the driver looking right ahead and the direction of the line of sight of the driver looking at the right end of the display 45 from the viewpoint of the driver is determined as the determination angle $A_{th}$ to the right. In the case where the display 45 is installed at a position that is horizontally asymmetrical with respect to a position right ahead of the driver, the determination angle $A_{th}$ to the left and the determination angle $A_{th}$ to the right are different from each other.

The invention claimed is:

1. An intersection guide system comprising:
a memory storing an intersection guide program; and
a processor that, when executing the program:
   acquires a distance from a vehicle to an intersection that is present ahead of the vehicle, a road upon which the vehicle is approaching the intersection having a plurality of lanes; and
   causes a display to:
      superimpose a guide image that provides guidance on a position of the intersection on a forward scene ahead of the vehicle, the guide image including a point that is superimposed on the position of the intersection and an arrow image connected to the point; and
      display the guide image superimposed on the forward scene;
   sets, as a position of superimposition of the point, an intersection position within the forward scene when the acquired distance from the vehicle to the intersection is more than a threshold, the intersection position corresponding to a registered position registered in map information as the position of the intersection; and
   sets, as the position of superimposition of the point, a straight-line position within the forward scene when the acquired distance from the vehicle to the intersection is equal to or less than the threshold, the straight-line position corresponding to a position on a straight-ahead line that is a straight line extending in a travel direction of the vehicle from the vehicle.

2. The intersection guide system according to claim 1, wherein the processor, when executing the program:
   acquires a projected space corresponding to the forward scene that is a part of a space ahead of the vehicle and is projected on the display section; and
   sets, as the position of superimposition of the point, an end position within the forward scene when the acquired distance from the vehicle to the intersection is more than the threshold and the registered position is present on a left side or a right side with respect to the projected space, the end position corresponding to a position at a left end or a right end within the projected space.

3. The intersection guide system according to claim 1, wherein the processor, when executing the program:
   determines that the acquired distance from the vehicle to the intersection is more than the threshold when a remaining distance from the vehicle to the intersection is longer than a predetermined reference distance.

4. The intersection guide system according to claim 1, wherein the processor, when executing the program:
   determines that the acquired distance from the vehicle to the intersection is more than the threshold when an angle formed in a horizontal plane between a straight line extending from the vehicle to the registered position and the straight-ahead line is larger than a predetermined reference angle.

5. The intersection guide system according to claim 1, wherein the processor, when executing the program:
   determines that the acquired distance from the vehicle to the intersection is more than the threshold when a required period before the vehicle reaches the intersection is longer than a predetermined reference period.

6. The intersection guide system according to claim 1, wherein the processor, when executing the program:
   causes the display to display a forward image obtained by capturing the forward scene with an optical axis positioned on the straight-ahead line; and
   sets, as the straight-line position, a position on a bisector of the forward image in a lateral direction when the acquired distance from the vehicle to the intersection is equal to or less than the threshold.

7. The intersection guide system according to claim 2, wherein the processor, when executing the program:
   determines that the registered position is present on the left side or the right side with respect to the projected space when an angle formed in a horizontal plane between a straight line extending from the vehicle to the registered position and the straight-ahead line is larger than a predetermined determination angle.

8. An intersection guide method comprising:
   acquiring, with a processor, a distance from a vehicle to an intersection that is present ahead of the vehicle, a road upon which the vehicle is approaching the intersection having a plurality of lanes;
   causing, with the processor, a display to display a guide image that provides guidance on a position of the intersection superimposed on a forward scene ahead of the vehicle, the guide image including a point that is superimposed on the position of the intersection and an arrow image connected to the point;
   setting, with the processor, as a position of superimposition of the point, an intersection position within the forward scene when the acquired distance from the vehicle to the intersection is more than a threshold, the intersection position corresponding to a registered position registered in map information as the position of the intersection; and
   setting, with the processor, as the position of superimposition of the point, a straight-line position within the forward scene when the acquired distance from the vehicle to the intersection is equal to or less than the threshold, the straight-line position corresponding to a position on a straight-ahead line that is a straight line extending in a travel direction of the vehicle from the vehicle.

9. A non-transitory storage medium storing a computer-executable intersection guide program, the program comprising:
   instructions for acquiring distance from a vehicle to an intersection that is present ahead of the vehicle, a road upon which the vehicle is approaching the intersection having a plurality of lanes;
   instructions for causing a display to display a guide image that provides guidance on a position of the intersection superimposed on a forward scene ahead of the vehicle, the guide image including a point that is superimposed on the position of the intersection and an arrow image connected to the point;
   instructions for setting, as a position of superimposition of the point, an intersection position within the forward scene when the acquired distance from the vehicle to the intersection is more than a threshold, the intersection position corresponding to a registered position registered in map information as the position of the intersection; and
   instructions for setting, as the position of superimposition of the point, a straight-line position within the forward scene when the acquired distance from the vehicle to the intersection is equal to or less than the threshold, the straight-line position corresponding to a position on a straight-ahead line that is a straight line extending in a travel direction of the vehicle from the vehicle.

10. The intersection guide method according to claim 8, further comprising:
   acquiring, with the processor, a projected space corresponding to the forward scene that is a part of a space ahead of the vehicle and is projected on the display section; and
   setting, with the processor, as the position of superimposition of the point, an end position within the forward scene when the acquired distance from the vehicle to the intersection is more than the threshold and the registered position is present on a left side or a right side with respect to the projected space, the end position corresponding to a position at a left end or a right end within the projected space.

11. The intersection guide method according to claim 8, further comprising:
   determining, with the processor, that the acquired distance from the vehicle to the intersection is more than the threshold when a remaining distance from the vehicle to the intersection is longer than a predetermined reference distance.

12. The intersection guide method according to claim 8, further comprising:
   determining, with the processor, that the acquired distance from the vehicle to the intersection is more than the threshold when an angle formed in a horizontal plane between a straight line extending from the vehicle to the registered position and the straight-ahead line is larger than a predetermined reference angle.

13. The intersection guide method according to claim 8, further comprising:
   determining, with the processor, that the acquired distance from the vehicle to the intersection is more than the threshold when a required period before the vehicle reaches the intersection is longer than a predetermined reference period.

14. The intersection guide method according to claim 8, further comprising:
   causing, with the processor, the display to display a forward image obtained by capturing the forward scene with an optical axis positioned on the straight-ahead line; and
   setting, with the processor, as the straight-line position, a position on a bisector of the forward image in a lateral direction when the acquired distance from the vehicle to the intersection is equal to or less than the threshold.

15. The intersection guide method according to claim 10, further comprising:
   determining, with the processor, that the registered position is present on the left side or the right side with respect to the projected space when an angle formed in a horizontal plane between a straight line extending from the vehicle to the registered position and the straight-ahead line is larger than a predetermined determination angle.

16. The storage medium according to claim 9, the program further comprising:
   instructions for acquiring a projected space corresponding to the forward scene that is a part of a space ahead of the vehicle and is projected on the display section; and
   instructions for setting as the position of superimposition of the point, an end position within the forward scene when the acquired distance from the vehicle to the intersection is more than the threshold and the registered position is present on a left side or a right side with respect to the projected space, the end position corresponding to a position at a left end or a right end within the projected space.

17. The storage medium according to claim 9, the program further comprising:
   instructions for determining that the acquired distance from the vehicle to the intersection is more than the threshold when a remaining distance from the vehicle to the intersection is longer than a predetermined reference distance.

18. The storage medium according to claim 9, the program further comprising:
   instructions for determining that the acquired distance from the vehicle to the intersection is more than the threshold when an angle formed in a horizontal plane between a straight line extending from the vehicle to the registered position and the straight-ahead line is larger than a predetermined reference angle.

19. The storage medium according to claim 9, the program further comprising:
   instructions for determining that the acquired distance from the vehicle to the intersection is more than the threshold when a required period before the vehicle reaches the intersection is longer than a predetermined reference period.

20. The storage medium according to claim 9, the program further comprising:
   instructions for causing the display to display a forward image obtained by capturing the forward scene with an optical axis positioned on the straight-ahead line; and
   instructions for setting as the straight-line position, a position on a bisector of the forward image in a lateral direction when the acquired distance from the vehicle to the intersection is equal to or less than the threshold.

* * * * *